United States Patent [19]

Niwa et al.

[11] Patent Number: 4,758,916
[45] Date of Patent: Jul. 19, 1988

[54] MULTI-HEAD TRANSDUCER ASSEMBLY FOR HELICAL SCAN VIDEO TAPE RECORDERS

[75] Inventors: Kazuhiro Niwa, Yokohama; Masahiro Kudo, Yokosuka; Shigeru Michiwaki, Yokohama, all of Japan

[73] Assignee: Victor Company of Japan, Ltd., Yokohama, Japan

[21] Appl. No.: 906,118

[22] Filed: Sep. 10, 1986

Related U.S. Application Data

[63] Continuation-in-part of Ser. No. 705,602, Feb. 26, 1985, Pat. No. 4,652,955.

[30] Foreign Application Priority Data

Sep. 10, 1985 [JP] Japan ................... 60-198646
Sep. 10, 1985 [JP] Japan ................... 60-198647

[51] Int. Cl.$^4$ .................. G11B 5/127; G11B 5/133
[52] U.S. Cl. ................................ 360/121; 360/122
[58] Field of Search ........................ 360/121, 122

[56] References Cited

U.S. PATENT DOCUMENTS

| | | |
|---|---|---|
| 3,846,819 | 11/1974 | Warren . |
| 3,978,523 | 8/1976 | Tanaka et al. . |
| 4,107,751 | 8/1978 | Shimoda . |
| 4,393,428 | 7/1983 | Fujimura . |
| 4,531,170 | 7/1985 | Takei et al. ............... 360/121 X |
| 4,589,043 | 5/1986 | Grundtner ............... 360/121 |
| 4,652,955 | 3/1987 | Niwa et al. ............... 360/121 |

FOREIGN PATENT DOCUMENTS

| | | |
|---|---|---|
| 3104930 | 1/1982 | Fed. Rep. of Germany . |
| 2519175 | 7/1983 | France . |
| 52-75311 | 6/1977 | Japan . |
| 56-23 | 1/1981 | Japan . |
| 56-25223 | 3/1981 | Japan . |
| 56-34126 | 4/1981 | Japan . |
| 57-172523 | 9/1982 | Japan . |
| 58-80119 | 5/1983 | Japan . |
| 58-111120 | 7/1983 | Japan . |
| 59-14115 | 1/1984 | Japan . |
| 59-92422 | 5/1984 | Japan . |
| 60-13312 | 1/1985 | Japan . |
| 2070842 | 9/1981 | United Kingdom . |
| 2099204 | 12/1982 | United Kingdom . |
| 2113896 | 8/1983 | United Kingdom . |

Primary Examiner—Stuart N. Hecker
Assistant Examiner—Alyssa H. Bowler
Attorney, Agent, or Firm—Lowe, Price, LeBlanc, Becker & Shur

[57] ABSTRACT

An electromagnetic transducer assembly for use in a helical-scan type video tape recorder includes a pair of magnetic heads secured to a nonmagnetic base and successively arranged in spaced relationship with each other in the direction of transport of a magnetic medium, each of the heads comprising a generally U-shaped core having a pair of limb portions and a web portion therebetween, a generally I-shaped core connected to the limb portions to form a closed magnetic circuit having a magnetic gap therein, and a coil wound on the closed magnetic circuit, the I-shaped cores of the heads respectively having confronting edges extending unparallel to the magnetic gaps.

2 Claims, 3 Drawing Sheets

MULTI-HEAD TRANSDUCER ASSEMBLY FOR HELICAL SCAN VIDEO TAPE RECORDERS

RELATED APPLICATION

This application is a continuation-in-part application of co-pending U.S. patent application Ser. No. 705,602, filed Feb. 26, 1985, now U.S. Pat. No. 4,652,955, of Niwa et al, and assigned to the same assignee as the present invention.

BACKGROUND OF THE INVENTION

The present invention relates generally to electromagnetic transducers, and more particularly to a multi-head video transducer assembly for helical scan type video tape recorders.

Multi-head magnetic transducer assemblies are currently employed in helical scan video tape recorders to effect still-picture or slow-motion playback. Such a multi-head transducer assembly comprises a pair of magnetic heads secured to a base and arranged successively in spaced relationship in the direction of transport of a magnetic tape. Each head has a generally U-shaped core and an I-shaped core connected to the limb portions of the U-shaped core to form a closed magnetic circuit with a magnetic gap therein. The heads are arranged so that the I-shaped core of each head is located in opposition to the I-shaped core of the other head. The opposite portions of the I-shaped cores adjacent the magnetic gaps respectively have right-angled edges which run parallel to the magnetic tape.

However, it has been difficult to obtain satisfactory image quality on such special mode playback.

SUMMARY OF THE INVENTION

The present invention is based on the discovery that the image quality is subject to degradation from crosstalk beween the paired transducer heads due to the creation of false magnetic gaps at the sharp edge portions of the I-shaped cores which are held in intimate sliding contact with a magnetic tape as it runs along the transducer heads.

According to the present invention, the I-shaped cores of respective magnetic heads of a video transducer assembly have confronting edges extending unparallel to magnetic gaps defined in closed magnetic circuits formed by the I-shaped cores and U-shaped cores joined thereto. The confronting edges may be of a flat or wedge-shaped cross section, or may be a round cross section. The confronting edges unparallel to the magnetic gaps eliminate a magnetic gap effect of the conventional multi-head transducer assembly and ensure excellent image quality.

BRIEF DESCRIPTION OF THE DRAWINGS

The present invention will be described in further detail with reference to the accompanying drawings, in which.

DETAILED DESCRIPTION

Figure 1:
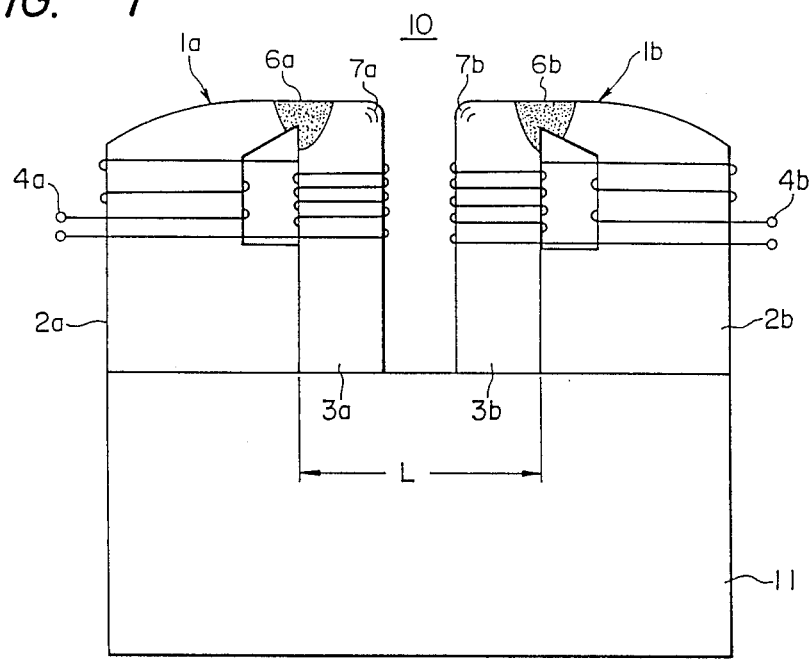
FIG. 1 is a plan view of a video transducer assembly according to an embodiment of the present invention, for use in helical scan video tape recorders.
Figure 2:
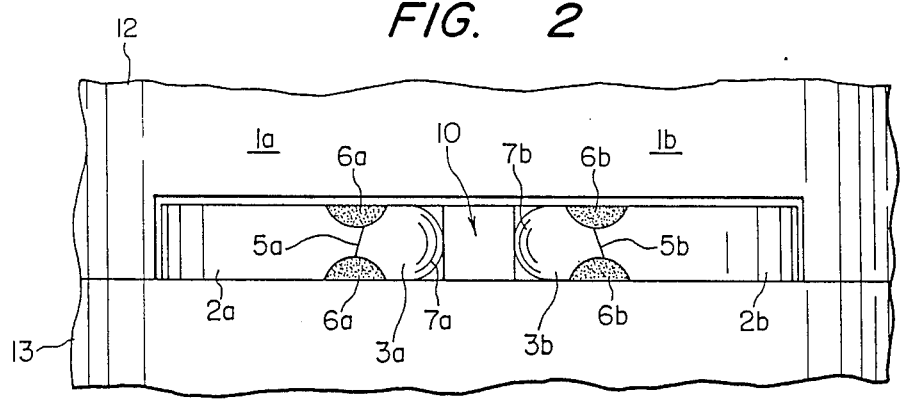
FIG. 2 is a front elevational view of the transducer assembly mounted in the rotary cylinder of a helical scan type video tape recorder.

In FIG. 1, a video transducer assembly according to an embodiment of the present invention, generally shown at 10, comprises a mount of head base 11 of nonmagnetic material, and a pair of electromagnetic transducer heads 1a, 1b firmly secured to the base 11. As shown in FIG. 2, the base 11 is secured in place to the rotary cylinder of a helical scan type video tape recorder between upper and lower drum halves 12, 13 to expose the head 10 slightly beyond the circumference of the cylinder. In a well known manner, another transducer assembly of similar construction is mounted in a diametrically opposite position on the rotary cylinder.

Figure 3:
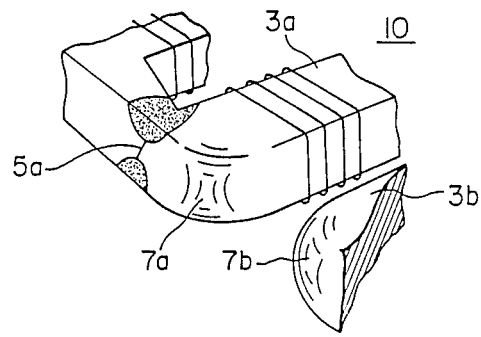
FIG. 3 is a fragmentary perspective view of the transducer assembly of FIG. 1.

Each head comprises a generally U-shaped ferromagnetic core 2 and I-shaped ferromagnetic core 3 secured to the front and rearside limb portions of the U-shaped core. As seen in FIGS. 1 to 3, the front limb of each U-shaped core is tapered and arcuately recessed at the end thereof and the front end portion of each I-shaped core is also arcuately recessed to form a tapered portion to form a magnetic gap 5. The reason for this is to provide a concentration of magnetic flux lines across the magnetic gaps 5a, 5b. As seen in FIG. 2, the magnetic gap 5a is inclined to the vertical in a direction opposite to the inclination of the magnetic gap 5b to the vertical. The recessed portions of the U- and I-shaped cores are filled with fused glass shown at 6a, 6b to precisely define the gap length.

The magnetic heads 1a and 1b are laterally spaced apart so that the distance L between the magnetic gaps 5a and 5b is preferably equal to 1 millimeter or less. To ensure this amount of spacing, the transverse dimension of each I-shaped core is smaller than the transverse dimension of the web portion of each U-shaped core. A coil 4a is wound on the web portion of the U-shaped core 2a and further wound on the I-shaped core 3a. Likewise, a coil 4b is wound on the web portion of the U-shaped core 2b and further wound on the I-shaped core 3b. During recording, a specified one of the heads is used to record a video program and the same head is used on playback. During a special mode of operation such as still-picture and slow-motion, the other head is additionally brought into play.

According to the present invention, the I-shaped cores 3a and 3b respectively have rounded front edge portions 7a and 7b to keep the edge portions from sharply contacting a magnetic tape being transported. These round shaped edge portions are thus rendered unparallel with the magnetic gaps 5a, 5b. This results in the elimination of a magnetic gap effect which would otherwise be produced by sharp edges parallel to the magnetic gaps.

Each of the windings 4a and 4b has N1 turns on the U-shaped core and N2 turns on the I-shaped core. To avoid radio interference, the turn ratio N1/N2 is preferably proportional to the ratio S2/S1, where S1 and S2 represent respectively the cross-sectional area of the magnetic circuit on the web portion of each U-shaped core (which corresponds to the area of contact of the U-shaped core with the magnetic tape) and the cross-sectional area of the magnetic circuit on the I-shaped core (which corresponds to the area of contact of the I-shaped core with the magnetic tape). Since the strength of radio interference noise produced is proportional to the core's cross-sectional area, radio interference noise introduced to the U-shaped core is cancelled by that introduced to the I-shaped core. The provision of the windings on both cores also raises the output level of the head without substantially increasing thermal noise due to the resistive component of the coils.

Experiments showed that crosstalk between the heads 1a and 1b was improved by approximately 6 dB and the output level was increased by approximately 3 dB.

Other embodiments of the present invention will be described with reference to FIGS. 4 through 12. Like or corresponding parts are denoted by like or corresponding reference numerals throughout FIGS. 4 through 12.

Figure 4:
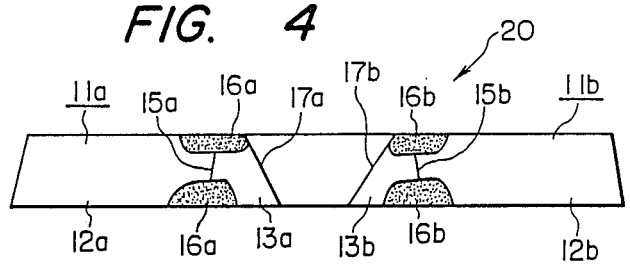
FIG. 4 is a front elevational view of a video transducer assembly according to another embodiment of the present invention.
Figure 5:
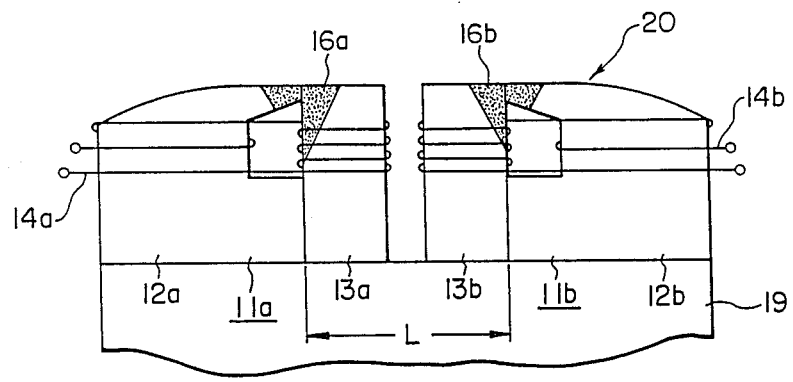
FIG. 5 is a plan view of the video transducer assembly shown in FIG. 4.

FIGS. 4 and 5 illustrate a video transducer assembly according to another embodiment of the present invention. The video transducer, generally indicated by the reference numeral 20, comprises a pair of ring-shaped electromagnetic transducer heads 11a, 11b securely mounted on a mount or head base 19. The transducer heads 11a, 11b comprises generally U-shaped ferromagnetic cores 12a, 12b, respectively, and I-shaped ferromagnetic cores 13a, 13b, respectively, secured to the front and rear limb portions of the U-shaped cores 12a, 12b, respectively. The distal end of the front limb of each of the U-shaped cores 12a, 12b, which faces the I-shaped core 13a, 13b, is tapered, and likewise the surface of each of the I-shaped cores 13a, 13b, which faces the tapered distal end of the front limb of the U-shaped core 12a, 12b, is complementarily tapered, thus forming magnetic gaps 15a, 15b. The opposite sides of the front limbs of the U-shaped cores 12a, 12b and the associated I-shaped cores 13a, 13b are recessed across the magnetic gaps 15a, 15b, and such recessed portions are filled with molded masses of glass 16a, 16b to precisely define the gap length.

The magnetic heads 12a and 12b are laterally spaced apart so that the distance L between the magnetic gaps 15a and 15b is preferably equal to 1 millimeter or less. To ensure this amount of spacing, the transverse dimension of each I-shaped core is smaller than the transverse dimension of the web portion of each U-shaped core. A coil 14a is wound on the web portion of the U-shaped core 12a and further wound on the I-shaped core 13a. Likewise, a coil 14b is wound on the web portion of the U-shaped core 12b and further wound on the I-shaped core 13b. During recording, a specified one of the heads is used to record a video program and the same head is used on playback. During a special mode of operation such as still-picture and slow-motion, the other head is additionally brought into play.

According to the embodiment shown in FIGS. 4 and 5, the I-shaped cores 13a, 13b have confronting edges 17a, 17b which are unparallel to the magnetic gaps 15a, 15b and which extend along straight lines, respectively, in a cross-sectional plane parallel to surfaces of the I-shaped cores 13a, 13b which slidingly contacts the magnetic tape.

Figure 6:
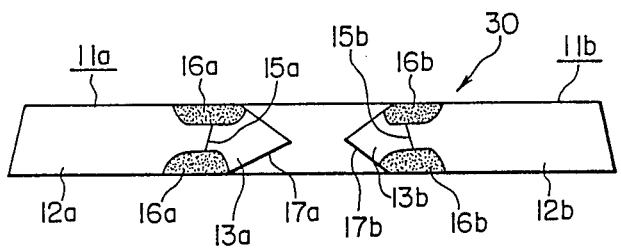
FIG. 6 is a front elevational view of a video transducer assembly according to still another embodiment of the present invention.
Figure 7:
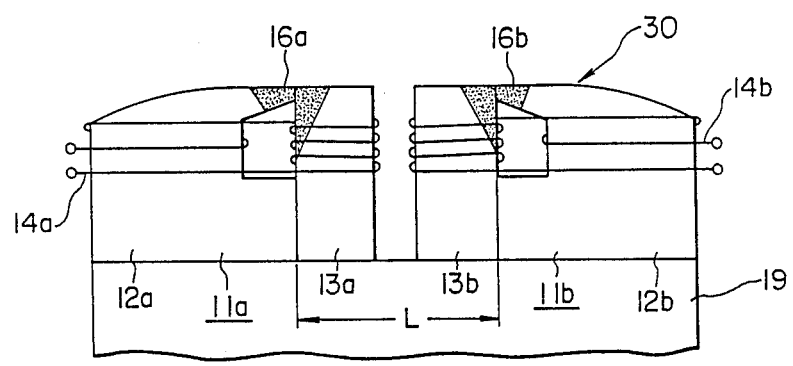
FIG. 7 is a plan view of the video transducer assembly shown in FIG. 6.

FIGS. 6 and 7 show a video transducer assembly according to still another embodiment of the present invention. The video transducer, generally indicated by the reference numeral 30, differs from the video transducer 20 of FIGS. 4 and 5 only in that the confronting edges 17a, 17b of the I-shaped cores 13a, 13b are cross-sectionally wedge-shaped in the form of a V and hence extend unparallel to the magnetic gaps 15a, 15b.

Figure 8:
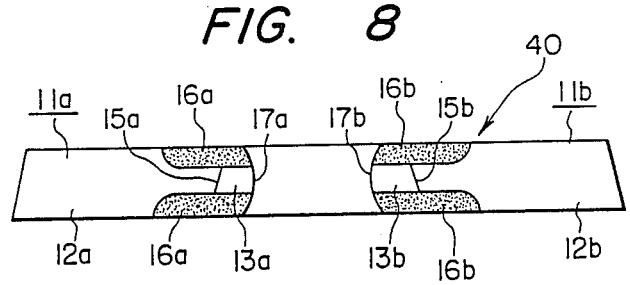
FIG. 8 is a front elevational view of a video transducer assembly according to a still further embodiment of the present invention.
Figure 9:
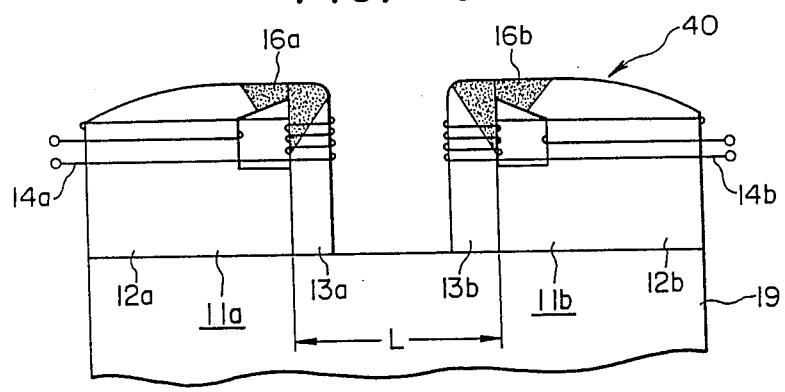
FIG. 9 is a plan view of the video transducer assembly shown in FIG. 8.

FIGS. 8 and 9 show a video transducer assembly according to a still further embodiment of the present invention. The video transducer, generally indicated by the reference numeral 40, differs from the video transducer 20 of FIGS. 4 and 5 in that the confronting edges 17a, 17b of the I-shaped cores 13a, 13b are cross-sectionally rounded or arcuate and hence extend unparallel to the magnetic gaps 15a, 15b. As illustrated in FIG. 8, the I-shaped cores 13a, 13b have surfaces for sliding contact with the magnetic tape, the sliding surfaces including exposed magnetic areas having substantially the same width as the length (track width) of the magnetic gaps 15a, 15b. This configuration is achieved by filling the molded masses of glass 16a, 16b in the sliding surfaces up to the confronting edges 17a, 17b of the I-shaped cores 13a, 13b. The magnetic areas which are thus limited in transverse dimension to the track width are advantageous in that they do not lie across a plurality of tracks and do not pick up any reproduced signals as crosstalk from undesired tracks due to a magnetic gap effect.

Figure 10:
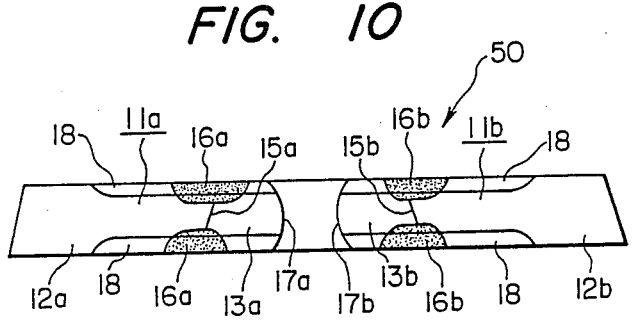
FIG. 10 is a front elevational view of a video transducer assembly according to a yet still further embodiment of the present invention.
Figure 11:
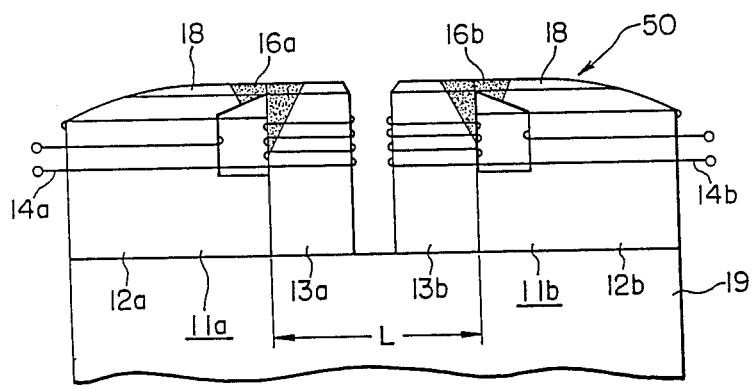
FIG. 11 is a plan view of the video transducer assembly shown in FIG. 10.
Figure 12:
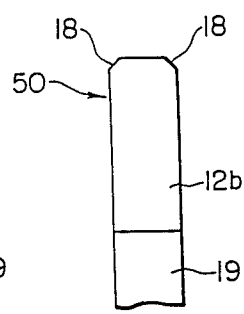
FIG. 12 is a side elevational view of the video transducer assembly shown in FIG. 10.

According to a yet still further embodiment of the present invention shown in FIGS. 10 through 12, a video transducer assembly 50 is substantially similar to the video transducer assembly 40 of FIGS. 8 and 9 except that the opposite edges of the U-shaped cores 12a, 12b on one of their limbs and the I-shaped cores 13a, 13b on their ends are cut off or beveled at 18 to define sliding surfaces extending from the confronting edges 17a, 17b across the magnetic gaps 15a, 15b and having the same width as the track width.

In each of the embodiments shown in FIGS. 4 through 12, the confronting edges 17a, 17b that extend unparallel to the magnetic gaps 15a, 15b are effective in the elimination of a magnetic gap effect which would otherwise be produced by confronting edges parallel to the magnetic gaps, and hence in reproducing images of good quality.

The flat confronting edges 17a, 17b shown in FIGS. 4 and 5 can easily be formed, with the result that the I-shaped cores 13a, 13b can easily be manufactured and the magnetic heads 11a, 11b can be produced inexpensively. The flat confronting edges 17a, 17b have azimuths opposite to those of the magnetic gaps 15a, 15b for effective reduction of crosstalk.

Each of the windings 14a and 14b has N1 turns on the U-shaped core and N2 turns on the I-shaped core. To avoid radio interference, the turn ratio N1/N2 is preferably proportional to the ratio S2/S1, where S1 and S2 represent respectively the cross-sectional area of the magnetic circuit on the web portion of each U-shaped core (which corresponds to the area of contact of the U-shaped core with the magnetic tape) and the cross-sectional area of the magnetic circuit on the I-shaped core (which corresponds to the area of contact of the I-shaped core with the magnetic tape). Since the strength of radio interference noise produced is proportional to the core's cross-sectional area, radio interference noise introduced to the U-shaped core is cancelled by that introduced to the I-shaped core. The provision of the windings on both cores also raises the output level of the head without substantially increasing thermal noise due to the resistive component of the coils.

Since the coils 14a, 14b are wound on both of the U-shaped cores 12a, 12b and the I-shaped cores 13a, 13b, they have a greater number of turns with respect to the same impedance than would coils wound on only the U-shaped cores 12a, 12b. Therefore, the video transducers of the present invention can produce an increased output signal without increasing the impedance noise of the magnetic heads.

Experiments showed that crosstalk between the heads 11a and 11b was improved by approximately a range of from 9 to 12 dB for the transducers shown in FIGS. 4 through 7, and improved by approximately 12 dB for the transducers illustrated in FIGS. 8 through 12.

Although certain preferred embodiments of the present invention have been shown and described in detail, it should be understood that various changes and modifications may be made therein without departing from the scope of the appended claims.

We claim:

1. An electromagnetic transducer assembly for use in a helical-scan type video tape recorder, comprising:
   a nonmagnetic base; and
   a pair of magnetic heads secured to said base and successively arranged in spaced relationship with each other in the scanning direction with respect to a magnetic medium, each of the heads comprising a generally U-shaped core having a pair of limb portions and a web portion therebetween, a generally I-shaped core connected to said limb portions to form a closed magnetic circuit having a magnetic gap therein, and a coil wound on said closed magnetic circuit, the I-shaped cores of said heads respectively having confronting edges which extend unparallel to the magnetic gaps and which extend along straight lines in a cross-sectional plane parallel to sliding surfaces of said I-shaped cores for sliding contact with the magnetic medium, said confronting edges being cross-sectionally wedge-shaped in the form of a V.

2. An electromagnetic transducer assembly for use in a helical-scan type video tape recorder, comprising:
   a nonmagnetic base; and
   first and second magnetic heads secured to said base and successively arranged in spaced relationship with each other in the scanning direction with respect to a magnetic medium, each of the heads comprising a generally U-shaped core having a pair of limb portions and a web portion therebetween, a generally I-shaped core connected to said limb portions to form a closed magnetic circuit having a magnetic gap therein, and a coil wound on said closed magnetic circuit, the I-shaped cores of said heads respectively having confronting edges which extend unparallel to the magnetic gaps and which extend along straight lines in a cross-sectional plane parallel to sliding surfaces of said I-shaped cores for sliding contact wtih the magnetic medium, said confronting edges being inclined with respect to a line normal to the scanning direction of said transducer assembly, said confronting edge of said first magnetic head being inclined in a direction opposite to the inclination of said confronting edge of said second magnetic head.

* * * * *